G. W. HUGHES.
Magazine Gun.
No. 1,943. Reissued May 2, 1865.
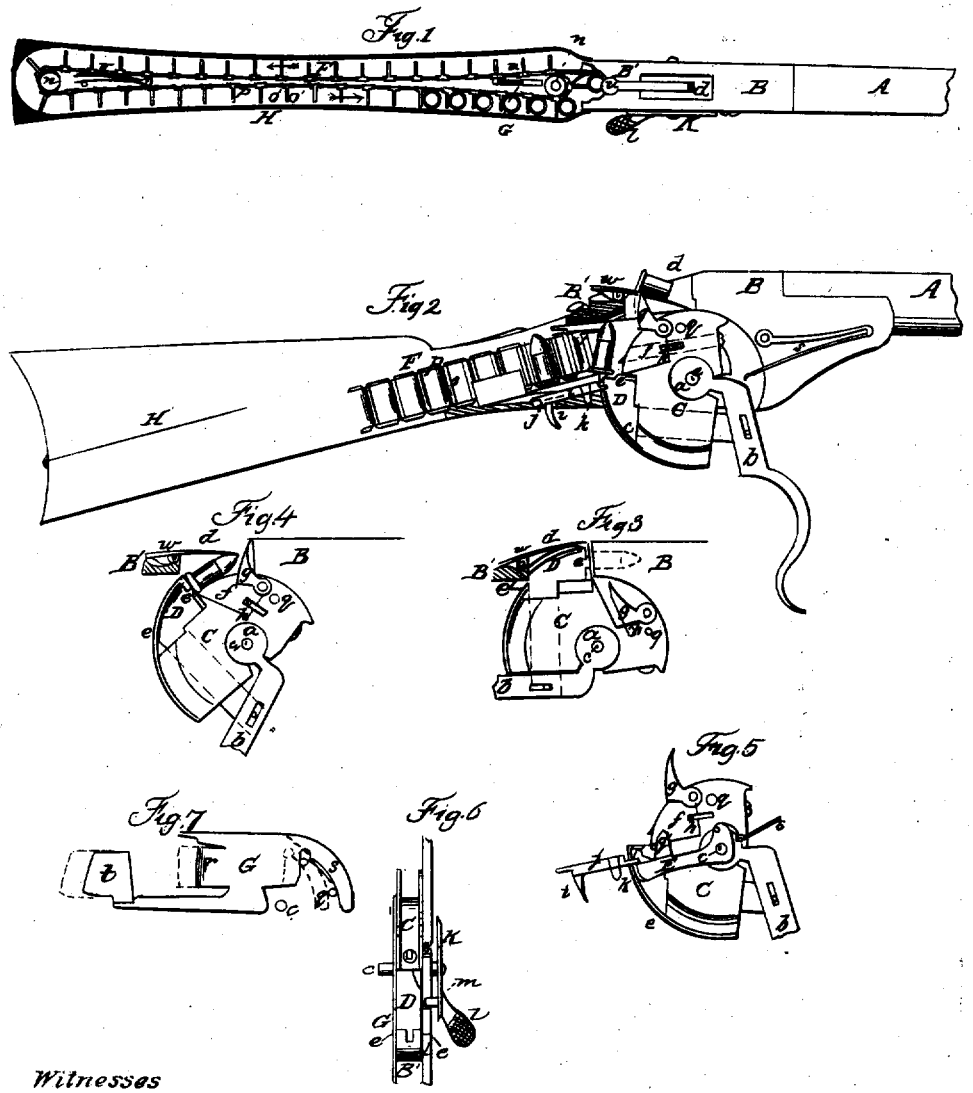
Witnesses
R. D. O. Smith
M. E. Dodge
Inventor:
G. W. Hughes.
N. PETERS, PHOTO-LITHOGRAPHER, WASHINGTON, D. C.

UNITED STATES PATENT OFFICE

G. W. HUGHES, OF BLOOMINGTON, ILLINOIS, ASSIGNOR TO BURNSIDE RIFLE COMPANY.

IMPROVEMENT IN MAGAZINE OR SELF-LOADING FIRE-ARMS.

Specification forming part of Letters Patent No. 45,043, dated November 15, 1864; Reissue No. 1,943, dated May 2, 1865.

*To all whom it may concern:*

Be it known that I, G. W. HUGHES, of Bloomington, in the county of McLean and State of Illinois, have invented certain new and useful Improvements in Fire-Arms; and I do hereby declare that the following is a full, clear, and exact description thereof, reference being had to the accompanying drawings, making part of this specification, and to the letters of reference marked thereon, in which—

Figure 1 is a top or plan view of the stock with its upper portion removed, so as to exhibit the magazine within. Fig. 2 is a side view of the portion containing the operating mechanism, with the side plate removed, for the purpose of exhibiting the mechanism and its mode of operating; and Figs. 3, 4, 5, 6, and 7 are detailed portions of the same.

My invention relates to that class of fire-arms known as "magazine breech-loaders;" and consists, first, in a novel construction of the device that closes and opens the breech, and of the devices for operating the same; second, in a novel construction of the devices used to feed the cartridges from the magazine into the gun and of the means used to operate the same; and, finally, of a peculiarly constructed and operating retractor for removing the cartridge-shells from the gun.

To enable others skilled in the art to construct and use my invention, I will proceed to describe it.

A is the barrel, constructed in the ordinary manner, being open at the rear, and secured to the metallic block or breech-holder B, which latter may be secured to the stock in any suitable manner. The block B has a circular cavity occupying the greater portion of its interior, into which is fitted the rolling breech-piece C, which is pivoted upon the circular head *a* of the lever-guard *b*, the latter being pivoted upon a bolt, *c*, as shown in Figs. 2, 3, 4, and 5, the head *a* of the lever-guard and the breech-piece C being of equal thickness, and each occupying laterally an equal space in the cavity in block B, and moving upon the same axis *c*.

The breech-piece C has a triangular notch or recess in its upper edge, formed by cutting away a portion thereof, and into this recess is fitted a sliding block, D, which is secured to C by having an arm extending down through a groove or mortise therein, and projecting below the bottom of C, which is connected to the lever-guard *b* by means of a pin passing through it and through a slot in *b*, as clearly shown in Figs. 2, 3, 4, and 5, the lever *b* being bent backward, so as to bring it in the proper position for that purpose.

The block D is of such a form as to fill the notch or recess in C, and when drawn down into said recess its outer face coincides with that of C immediately in its rear, so that the two form together the continuous arc of a circle, the center of which is at *c*. The front face of block D forms the breech-piece or recoil-plate proper of the gun, it being brought directly against the rear open end of the barrel when carried forward by the backward movement of the lever-guard *b*, which causes a partial rotation of C, as shown in Fig. 3, in which the breech is represented closed and the cartridge held in place by the block D. The block D is held firmly in this position by its shoulders *e e* being made to rest solidly against the front face of the rear wall of the opening *d*, as shown in Fig. 3, said wall being a portion of the breech-holder B. Fig. 6 is a top-plan view of these parts, in which the shoulders *e e* are clearly shown, with a tongue-like projection protruding backward and working in a corresponding recess in the periphery of block C when down, and also in a recess in the wall B′ when up, by which means the blocks C and D are made to break joints where they unite on their periphery.

A recess, *f*, as shown in the several figures, is formed in the sides of the upper forward portion of C, to give room for the cartridge-retractor *g g* to move back into when the block C is turned forward. This retractor consists of two wedge-shaped pieces, *g g*, having a short arm projecting forward at nearly right angles to the body, and by which they are pivoted to the block C, as shown. The retractor-points *g g* have the rear portion of their base resting upon a pin, *h*, which passes through a slot in C, and is held up by a spiral spring, which yields and permits the points *g g* to be turned backward and forced down into the recesses *f* as said points *g g* are brought in contact with the rear end of the barrel by the forward rotation of C.

E represents the hammer, which is pivoted upon the bolt *c* by the side of the breech-block C, it being located in the cavity with C, in which position it is covered and protected by the detachable side plate of B.

In Fig. 2, the spring S, that operates the hammer, is shown in full, and in Fig. 5 the hammer E is shown connected to said spring by a stirrup.

The trigger *i* is rigidly connected to a sliding bolt, *j*, which is held forward by a spring, *k*, and is so located that when the beveled head of the hammer is brought back in contact with the front end of said bolt *j* the latter is shoved back until the head of the hammer has passed by it, when it slides forward, and catching against the front face of the hammer-head, the latter is thereby secured in a cocked position ready for firing.

The gun may be cocked by the finger-piece *l*, which is secured to a disk, K, attached to the right-hand end of bolt *c* outside of the side plate of B, as shown in Figs. 1 and 6.

A pin or stud, *m*, projects from the inside of disk K and works through a curved slot in the side plate, the stud *m* projecting in sufficiently far to bring its end in front of the hammer, so that, as it is rotated backward by means of the finger-piece *l*, the hammer is carried back with it until secured by the trigger-bolt *j*, as already described, after which the finger-piece *l* may be returned to its original position, or may be left to be driven around by the hammer, as it is obvious it would be when the latter is released and comes in contact with the stud *m* of disk K, to which *l* is attached.

The point *a'* of the hammer strikes the flange of the cartridge through a small opening or notch, *e'*, in the side of the front face of the block D, as shown in Fig. 4, and, as this opening *e'* is not brought into the proper position to permit the point *a'* of the hammer to enter it until the block D has been shoved entirely up, it follows that the gun cannot be discharged until the lever-guard *b* is brought absolutely into position, by which means the breech is securely closed and locked, so as to effectually guard against accident or premature discharge.

It is obvious that as the block C is rotated backward after the gun has been discharged the hammer E will be carried backward with it by the projecting flange on the front portion of D, and thus the gun will be automatically cocked by the operation of the other parts.

The object of providing the independent cocking device is twofold—first, to cock the gun without moving the other parts, if desired; and, second, to uncock it without firing the gun, as is oftentimes necessary, and which may be readily done by taking hold of the finger-piece *l* and letting the hammer down gently after it has been released by pressing upon the trigger in the usual manner.

H represents the stock, in which I place a magazine of novel construction composed of an endless chain, F, constructed as shown in plan in Fig. 1, working around rollers mounted on pins *n m*, located vertically near each end of the magazine-chamber. Each alternate link *o* is provided with a flange, *o'*, projecting laterally at right angles from the body of the link, the links *o* being united to each other by wire links *p*, and thus forming a series of movable cells, in which the cartridges are placed in an upright or vertical position, with the balls or points uppermost. In order to permit the use of this magazine and the ready insertion of the cartridges therein, in the manner described, I divide the stock longitudinally into two parts, as shown in Fig. 2, the two parts being united in any suitable manner to render it secure and permit its being readily opened and closed.

By this construction of the stock and magazine, and by thus placing the cartridges in a vertical position, I am enabled to provide the arm with a magazine which will hold a much larger supply of ammunition than can be done when the cartridges are placed end to end, as has heretofore been done in guns of this class.

The chain F is operated by the sliding piece G, Fig. 7, which is fitted so as to slide back and forth in suitable grooves formed for it in the rear portion of the breech-holder B, its front portion sliding between the left-hand side of breech-block C and the inner face of the adjoining wall of B, its rear portion extending back into the front end of the chamber or magazine.

A stud or pin, *q*, projects from the left-hand side of C' a short distance in front of where the retractors *g g* are pivoted, as shown in Figs. 2, 3, 4, and 5. When the parts are in position for firing the gun the pin *q* occupies the position shown in Fig. 7; but when the lever-guard is thrown forward so as to rotate *c* backward, the pin *q* comes in contact with the front end of G, as shown in blue, from which point, as it continues to move, it carries the piece G with it until it reaches the position indicated in red, at which time the pin *q* will have arrived at its highest point directly over the axis *c*, and will have passed upward into the notch in the rear of *s*, as shown in red. As the motion of the parts is reversed the pin *q* will carry G forward with it until it arrives at the point where *q* slips entirely out of the notch, when G will remain stationary, while the pin *q* passes on to its original position.

To the rear portion of G is secured a vertical plate, *t*, which has on its left-hand face a projecting piece or lug, *u*, which is beveled toward the front, while its back end is formed into a hook that catches into the links of the chain, as shown in plan in Fig. 1. As the plate G is moved backward by the pin *q*, the hook *u*, taking into one of the links, moves the chain F with it; but when the motion is reversed the beveled face of *u* causes it to pass by the links without catching, and thus the chain is left stationary. In the space between the two parts of the chain, near the rear of the stock, is pivoted a latch, *v*, which is held up against the chain by a spring, as shown in Fig. 1.

A hook similar to that on *t* catches into the links of the chain, and thus holds it securely from being moved backward or in the wrong direction by any means whatever, while not interfering at all with its forward movement.

A lip or wing, *r*, is formed on the rear portion of the body of G, as shown in Fig. 7, the upper rear corner of which is curved inward to the right for the purpose of slipping in behind the cartridge as the latter is brought around against it by the wing *o'* of the chain, and thus to turn it point forward from a vertical into a horizontal position, so that it may be brought down upon the periphery of C, directly in front of D, by the movement of which parts it is then carried forward into the barrel.

A tongue, *w*, is pivoted in a recess in the upper side of B' in such a position that its longer arm projects forward into the opening *d*. A spring under its rear end throws the forward end down upon the block C, as shown in Fig. 2, the object of which is to keep the cartridge from falling or being forced out through the opening *d* in its forward movement from the magazine to the barrel, and also to form a bridge or bearing upon which the empty shell can be moved up through the opening *d* when said shell is forced backward by the retractors.

The operation of the arm is as follows: The magazine being filled with a supply of the flanged metallic cartridges, the lever-guard *b* is thrown slightly down, by which movement the block D is drawn down, so as to unlock the rolling breech-piece C and permit it to rotate backward. A further movement of the lever then rotates the block C, carrying the hammer E back and cocking the gun at the same time. The same movement also shoves the plate G backward, and thereby causes the chain F to move and bring a cartridge forward upon C in front of D. The lever-guard is then brought back to its original position, by which movement the cartridge is carried forward into the bore and the breech-pieces C and D locked in position, when the piece is fired in the usual manner. As the lever-guard *b* is again thrown forward the retractors *g g* have their points thrust in through slight recesses made for the purpose in the under side of the barrel, where they act as wedges on the front face of the flange of the cartridge, by which it is removed from the bore and forced back upon the bridge-piece *w*, after which, as C is rotated a short distance farther, the arms *g g* of the retractor come in contact with the shoulders upon the point of the recesses *f f*, and are thence carried bodily back with the block C, removing the cartridge-shell entirely from the gun, and thus the process may be repeated without stopping to reload until the whole forty charges, which the magazine is intended to contain, are all fired.

Having thus described my invention and its operation, what I claim as new, and desire to secure by Letters Patent, is—

1. I claim pivoting the rolling breech-piece C upon the circular head of the lever-bar, as shown and described.

2. I claim the sliding breech-block D, when constructed with the flange having an opening for the hammer to strike through, and operating in connection with block C, as herein set forth.

3. I claim pivoting the lever-guard *b*, breech-piece C, hammer E, and the independent cocking device all upon a single bolt, substantially as shown and described.

4. I claim the retractors *g g*, when constructed and operating as set forth.

5. I claim the use, in a magazine-gun, of a chain constructed and operating substantially as set forth.

6. I claim the plate G, or its equivalent, constructed and operating as and for the purpose herein set forth.

7. I claim the independent cocking device when constructed and operating as shown and described.

8. I claim dividing the rear portion of the stock longitudinally and horizontally, for the purpose of constructing a magazine therein and obtaining access to the same, substantially as and for the purpose herein set forth.

G. W. HUGHES.

Witnesses:

JAMES E. P. DEAN,
OLIVER P. DAVIS.